(No Model.)
W. L. MASTERS.
MACHINE FOR OPERATING AND CONTROLLING SIGNALS.
No. 533,307. Patented Jan. 29, 1895.
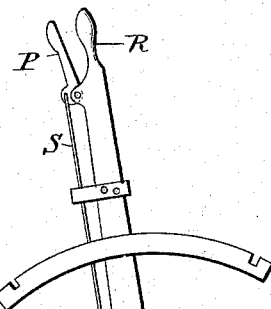
*Fig. 1.*
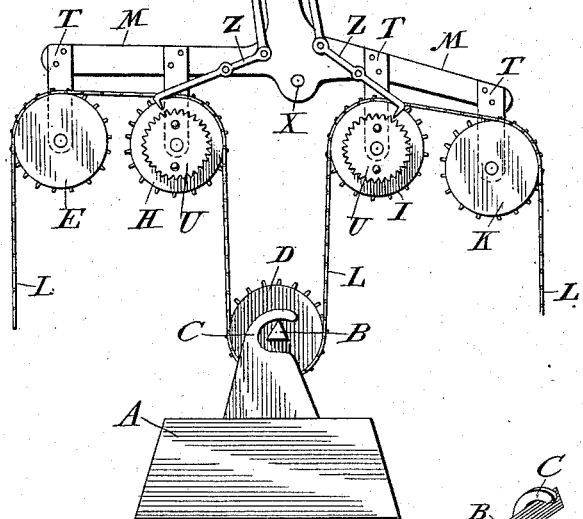
*Fig. 2.* *Fig. 3.*
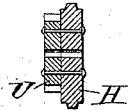
Witnesses:
Rena Randle
R Lee Hearn
Inventor.
William Lorain Masters
By his Attorney
Robert W Randle

UNITED STATES PATENT OFFICE.

WILLIAM LORAIN MASTERS, OF SCIO, OHIO.

MACHINE FOR OPERATING AND CONTROLLING SIGNALS.

SPECIFICATION forming part of Letters Patent No. 533,307, dated January 29, 1895.

Application filed May 7, 1894. Serial No. 510,334. (No model.)

*To all whom it may concern:*

Be it known that I, WILLIAM LORAIN MASTERS, a citizen of the United States, residing at Scio, in the county of Harrison and State of Ohio, have invented certain new and useful Improvements in Machines for Operating and Controlling Signals; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in machines for operating and controlling signals in which a lever works in conjunction with sprocket wheels and a weight; and the object of my improvements are, first, to provide a device that will always keep the proper tension on the wires which extend from the operating machine to the signal blocks; second, to provide a device that in case of accident to the machine or wires, will always show a danger signal, and, third, to provide a machine that will be easily operated and be perfectly reliable. I attain these objects by the mechanism illustrated in the accompanying drawings, in which—

Figure 1 is a view of the entire machine. Fig. 2 is a sectional view of one of the sprocket and ratchet wheels. Fig. 3 is a view of the weight and the axle of the wheel D.

Similar letters refer to similar parts throughout the several views.

The lever R, M, with projecting arms M, M, constitutes the frame for the sprocket wheels E, H, I and K which are suspended from the arms M, M, by the projections T. Said lever R, M, is pivoted at X. The wheels E and K are plain sprocket wheels, and the wheels H and I are sprocket wheels to which are secured the ratchet wheels U, U, as shown in Fig. 2. The wheel D is a plain sprocket wheel with a triangular shaped axle B so constructed that the friction will be reduced to a minimum, and to provide a bearing that it will not be necessary to lubricate.

The weight A has two arms projecting upward with notches on one side as shown at C. These arms are adapted to hook over the triangular axle B and thus suspend the weight A.

L represents a sprocket chain which passes over the wheels E, H, I and K and under the wheel D as shown.

Attached to the lever R, M, is a secondary lever P, S, attached to ratchets Z, Z, which ratchets work in the cogs of the wheels U, U.

The ends of the sprocket chain L are to be connected to the signals or to wires running thereto. Thus by lowering the ratchets or pawls Z, Z by means of the lever P and moving the lever R the signals will be raised or lowered and on releasing the lever P the ratchet will raise out of the cogs on the wheels U, U, thus leaving the chain L free to expand and contract. The weight A will keep the chain and wire at the proper tension, and will take up all the slack.

The shaft of sprocket wheel D is made triangular so that one whole revolution of the wheel over to the left will turn the weight off of the shaft. In regular work the wheel only gives about a quarter turn, but in case of an accident, as, for instance, should the line or chain break, the wheel will turn the shaft out of the arms and the weight will fall to the ground and thus leave the signals in their proper position.

What I claim as my invention, and desire to secure by Letters Patent, is—

1. The combination in a signal operating machine, of the lever M, M, M, to which is attached the sprocket wheels E, K, and sprocket and ratchet wheels H, U, and I, U, with the sprocket chain L passing over said wheels and under sprocket wheel D all substantially as set forth.

2. The combination with the plain sprocket wheels E, K, and the combined sprocket and ratchet wheels H, U, and I, U, of the sprocket chain L passing over said wheels and under sprocket wheel D all substantially as shown and described.

3. The combination with the wheel D and its triangular axle of the weight A, having two upward projecting arms with notches C on one side of each arm and adapted to receive the triangular axle of the wheel D and thus suspend the weight A upon the axle B of the wheel D all substantially as set forth and for the purpose specified.

4. The combination with lever M, of the pawls Z Z operated by means of the lever P, S, and adapted to engage in the ratchets U, U, all substantially as set forth and described.

5. The combination in a signal operating machine, of the lever M, M, M, the sprocket wheels E, K, the sprocket and ratchet wheels H, U, and I, U, the sprocket wheel D with triangular axle B, and the weight A with upward projecting arms adapted to hook over and suspend the weight A upon the triangular axle B, all substantially as set forth and for the purposes specified.

In testimony whereof I affix my signature in presence of two witnesses.

WILLIAM LORAIN MASTERS.

Witnesses:
L. B. WORLEY,
H. W. WILLETT.